Feb. 4, 1969  G. FLEISSNER ET AL  3,425,789
APPARATUS AND METHOD FOR THE WET-TREATMENT OF
MATERIALS WHICH ARE PERMEABLE TO LIQUIDS
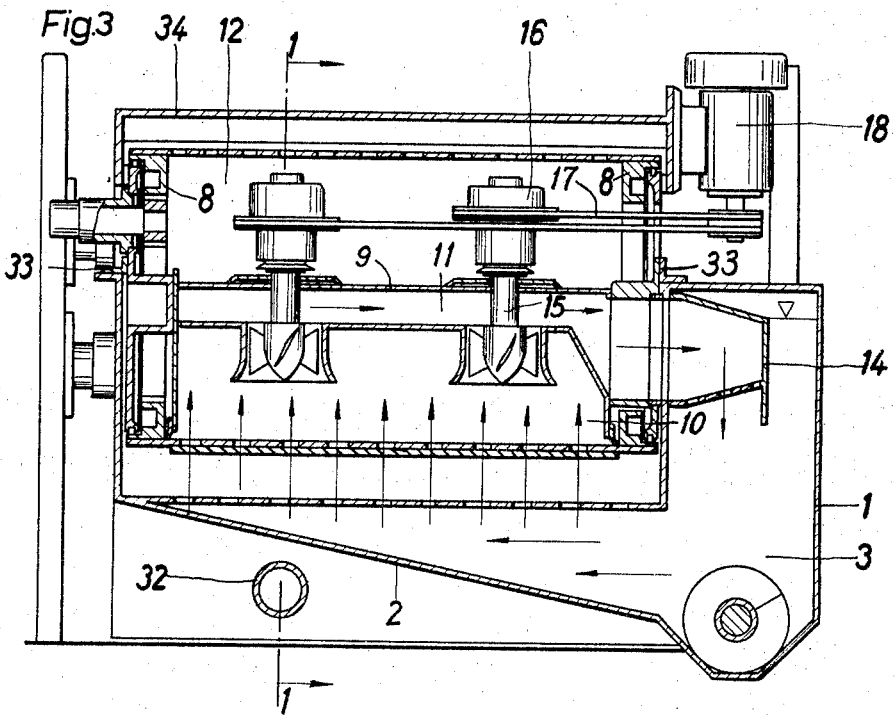
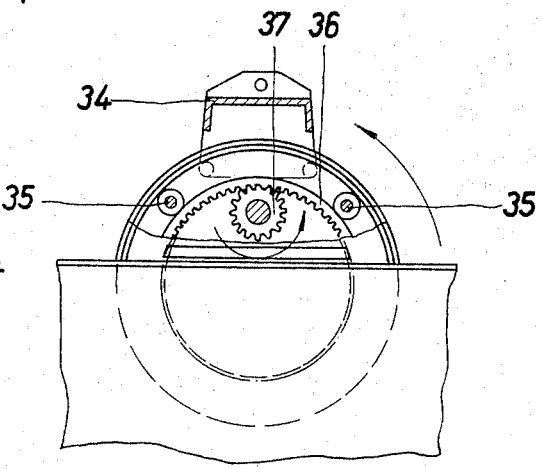
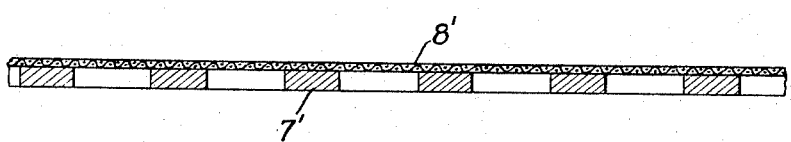
Inventor:
GEROLD FLEISSNER
HEINZ FLEISSNER

# United States Patent Office 3,425,789
Patented Feb. 4, 1969

3,425,789
APPARATUS AND METHOD FOR THE WET-TREATMENT OF MATERIALS WHICH ARE PERMEABLE TO LIQUIDS
Gerold Fleissner and Heinz Fleissner, Egelsbach, near Frankfurt am Main, Germany, assignors to Vepa AG, Basel, Switzerland
Filed Jan. 27, 1967, Ser. No. 612,146
Claims priority, application Germany, Jan. 29, 1966, A 51,461
U.S. Cl. 8—151     28 Claims
Int. Cl. D06c *1/00;* D06f *37/02*

ABSTRACT OF THE DISCLOSURE

The present disclosure relates to a method and apparatus for the wet-treatment of materials which are permeable to liquids, such as lengths of textile materials, for example, fabrics, knit goods, nonwovens, and the like. The treating apparatus comprises a sieve drum as the conveying element, said sieve drum being at least partially immersed in a treatment liquid and subjected to a uniform suction draft over its entire working width, said suction draft provided by suction pumps disposed within the sieve drum.

BACKGROUND OF THE INVENTION

The present invention relates to a method and apparatus for the wet-treatment of materials which are permeable to liquids, such as, lengths of textile materials, for example, fabrics, knit goods, nonwovens, and the like. More particularly, the present invention concerns a wet-treatment method and apparatus comprising a treatment bath and at least one sieve drum as the conveying element, said sieve drum being subjected to a suction draft and at least partially immersed in a treatment liquid.

Treatment apparatus in which sieve drums subjected to a suction draft are used as conveying elements in a treatment bath are well known. In these devices the treatment liquid is drawn through the material to be treated and thus an intense wetting of the material as well as an intense mass transfer is obtained. In the known devices, the suction means is arranged either at one face of the sieve drum in the liquid, or is situated outside the treatment bath and a suction tube which is connected with the suction means is introduced into the sieve drum. That part of the suction tube which extends into the sieve drum is perforated so that the treatment liquid can be drawn off over the entire working width of the sieve drum through the suction tube.

It is a well known fact that the suction draft is most powerful at the pump side and then decreases rapidly as the distance from the pump is increased. Thus, for example, in presently known wet-treatment apparatus where the suction device is situated at the face of the sieve drum, the suction draft at the treatment surface of the drum is relatively weak. This is not only the case with devices in which the suction device is situated at the face of the sieve drum, inside the liquids, but also with devices in which a suction tube is used which extends over the whole working width of the sieve drum. When using a suction tube, another disadvantage must be taken into account, that is, the suction tube forms a substantial resistance to liquid circulation and also consumes a substantial amount of the pump capacity. The presently used devices are therefor only suitable for small working widths, for materials which do not necessarily need to be treated uniformly and where many treatment devices or sieve drums subjected to a suction draft are used to provide a sufficient treatment affect also at the side with the weak suction draft.

Accordingly, it is an object of the present invention to provide a wet-treatment method and apparatus which avoids the disadvantages of the known devices.

Another object of the present invention is to provide an improved wet-treatment apparatus and method wherein the sieve drum is subdivided into at least one suction space and an adjacent pressure space which provides for returning the treatment liquid to the treatment bath.

A further object of the present invention is to locate the suction pump and/or pumps in the sieve drum to provide a more uniform suction draft over the entire working width of the sieve drum.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

SUMMARY OF THE INVENTION

According to the present invention, an improved wet-treatment method and apparatus has been discovered comprising a sieve drum as the conveying element at least partially immersed in a treatment liquid, wherein said sieve drum is subdivided by means of partitions parallel to the sieve drum axis into at least one suction space and an adjacent pressure space, and in which device at least one and preferably several pumps are provided which pass the treatment liquid through the material being treated into the suction space and from the suction space into the pressure space to be returned to the treatment bath. According to the present invention, the faces of the sieve drums may be connected with the partitions to a stationary unit and sealed towards the rotating sieve drum jacket. By arranging the pumps in the sieve drum, more uniform suction draft over the entire working width can be obtained. If only one pump is used, this pump will be arranged in the center of the sieve drum so that the suction draft is distributed equally over the working width of the sieve drum. However, one pump will generally be used only with relatively small working widths. With larger working widths several pumps can be arranged in the same sieve drum. Thus, it is possible to construct an apparatus with any desired working width by merely using the desired number of pumps necessary to obtain a substantially uniform suction draft over the entire working width.

In a further embodiment of the present invention, at least part of the liquid drawn off and pumped into the pressure space is discharged at one face of the sieve drum and returned into the treatment bath in a suitable manner, for example, beneath a sieve drum bottom arranged in the treatment bath. However, it is also desirable to return at least part of the liquid from the pressure space through the sieve drum jacket into the treatment bath. This may be done at the side of the sieve drum which is not covered with material as well as at the side of the sieve drum which is covered with material. This is of particular advantage in the latter case where in each circulation cycle the treatment liquid is passed twice and alternately through the material to be processed.

According to another embodiment of the present invention, the pumps in the sieve drums can be arranged substantially perpendicular to the partitions with the pump shaft extended so that the pump bearings are situated outside of the treatment liquid. Using this arrangement, the treatment liquid, dirt and corrosive substances are prevented from entering the pump bearings which would result in a rapid wear of the bearings. Thus, the lifetime of these bearings can be substantially increased.

In order to make it possible to vary the suction range or to adjust it, it is also advantageous to arrange the partitions in the sieve drum so they can be adjusted, preferably by swiveling. Furthermore, it is also desirable to arrange the pump drive outside the sieve drums. This facilitates the use of a large motor to drive all of the pumps in an sieve drum. The joint pump drive may be connected with the pumps by means of V-belts.

One of the disadvantages of the known devices using centrally rotating sieve drums is that the sieve drum bearings are generally situated beneath the liquid level or at the same height as the liquid level. Sealing the sieve drum bearings from the treatment liquid is very difficult. After a certain period of operation, the seal tends to become leaky and the treatment liquid enters the sieve drum bearings causing rapid wear of these bearings. Thus in the well known sieve drum wash baths, the sieve drum bearings must be frequently replaced, often after only a few weeks of operation. This, of course, results in a shut-down of the washing apparatus and in extended and expensive maintenance work. According to the present invention, the sieve drum bearings are disposed outside of the treatment liquid, including devices in which the sieve drum axis is situated at the same level or beneath the liquid level. This can be achieved in an effective manner by mounting a bearing ring with, for example, an U-shaped cross section, to the faces of the sieve drums. At least one roller, preferably two or three rollers extend into the bearing rings for supporting the sieve drum. Thus, the sieve drum rests and rolls on said rollers. The rollers may be mounted to the stationary faces of the sieve drum. If three rollers are used for supporting the sieve drum, two rollers may rest against the outer rolling surface of the bearing ring and one roller, that is, the center roller, may rest against the inner rolling surface of the bearing ring. By using the three-point guidance approach, a safe and clearance-free support and guidance of the sieve drum can be ensured. In general, it is sufficient to provide a three-roller support at one face of the sieve drum, and at the other face one or two rollers on which the sieve drum rests will be sufficient. Since a certain clearance is generally admissible using these sieve drums, it will usually be sufficient to provide for two rollers which have a diameter which substantially corresponds to the free distance of the rolling surfaces of the bearing rings. Using this measurement for the rollers, it is assured, even with two rollers, that the sieve drum rotation is properly fixed since even with a slight lifting or release of the sieve drums, the rollers will rest against the inner rolling surface of the bearing ring.

Furthermore, it has been found that it is often advantageous if not only the faces of the sieve drum are sealed against the sieve drum jacket but also if behind the bearing ring another partition is provided, at least for that part of the sieve drum which is situated in the liquid, which partition is sealed against the sieve drum jacket so that the bearing ring is situated in a closed chamber. It is permissible that liquid enters the chamber in which the bearing ring is situated and if this chamber is filled with liquid up to the liquid level in the bath. This guarantees that at the faces no air can be drawn in which would result in a foaming of the treatment liquid, which must be avoided.

For driving the sieve drum in accordance with the present invention, a gear rim may be provided at the drive face of the sieve drum, preferably at the bearing ring, into which a pinion of the drum drive outside the treatment liquid engages.

When using several treatment baths, one behind the other, especially wash and rinse baths, and when processing loose materials, for example, raw wool, the liquid exchange between the individual baths is generally provided on the counter-current principle, whereas in the bath the liquid exchange is effected on the co-current principle, so that a flow in the direction of material passage prevails in the individual paths. Behind each bath a squeezing device is provided by which the excess treatment liquid adhering to the material being processed is removed.

In the known devices, the liquid exchange between the individual baths is accomplished by staggering the baths. Because of the difference in the liquid level thus obtained, the liquid exchange is ensured. However, the liquid exchange and/or the quantity of the liquid exchanged can only be set at the last bath by means of the quantity of fresh water which is supplied to the last bath. The staggered arrangement of the bath correspondingly requires additionally constructed foundations which result in additional costs when erecting the device. In order to eliminate these disadvantages, it is suggested, according to another embodimnet of the present invention, to keep the liquid at substantially the same height in all of the treatment baths. The liquid exchange according to the aforementioned principle can be obtained by providing for each treatment bath a collecting tank for collecting the treatment liquid squeezed out by the squeezing device, said collecting tanks being connected with each other by means of pipes and provided with a pump for returning the treatment liquid to the appertaining treatment bath. In these collecting tanks a verying liquid level can be established. In a further feature of the present invention, each collecting tank can be subdivided into two zones by a partition which establishes a different liquid level in these two zones. This can be readily achieved for example, if the two zones of the collecting tank communicate with each other, for the exchange of liquid, through a free area which advantageously can be varied in size to set the difference in the liquid level. In one zone of the collecting tank the liquid from the squeezing rollers is collected and in the other zone of the collecting tank the pump for returning the liquid to the treatment bath is disposed. If the zone of the collecting tank with the high liquid level is connected with adjacent zone of the collecting tank by means of a pipe, the liquid exchange between these two collecting tanks is effected by the difference in the liquid level. By enlarging or reducing the free area for the passage of the liquid from one zone of the collecting tank to the other zone, the desired level difference can be set and the liquid exchange can thus be controlled.

In the known devices, the sieve drum jacket is made of a perforated sheet. The perforations must be as small as possible in order to avoid the drawing off of loose fibers from the fleece and/or the drawing of loose fibers into the sieve drum which eliminates the danger of clogging. With such small perforations, the free area of the sieve drum is relatively small so that the sieve drum offers considerable resistance to liquor circulation. According to the present invention, the free area of the sieve drum and the perforations of the sieve drum can be enlarged without detrimental effects if the sieve drum is surrounded by a fine wire mesh. Surprisingly, it has also been found that with the same pump capacity, substantially larger liquor quantities can be drawn through the material if, according to another feature of the present invention, a wide-meshed wire mesh or another such supporting device is disposed between the sieve drum jacket and the fine wire mesh cover. This supporting device keeps the fine wire mesh cover at a prescribed distance from the drum jacket. This surprising result can be explained by the fact that in the case of a sieve drum without a wire mesh cover, the suction draft through the textile material is effective only at the perforations. However, by using a fine wire mesh cover, the suction draft is extended to the marginal zones around each hole and by a supporting wire mesh a uniform suction draft is obtained over the entire drum surface subjected to a suction draft. Thus, a more uniform penetration and wetting of the material to be treated can be obtained.

BRIEF DESCRIPTION OF THE DRAWINGS

The present invention will become fully understood from the detailed description hereinbelow and the accompanying drawings which are given by way of illustration only and thus are not limitive of the present invention and wherein:

FIGURE 3 is a cross-sectional view of the apparatus according to FIGURE 1; and

FIGURE 4 is a side view of the drive side of the sieve drum of the present invention.

FIGURE 5 is a greatly enlarged illustration of a fine wire mesh cover disposed directly on the sieve drum jacket.

DESCRIPTION OF THE PREFERRED EMBODIMENTS

Figure 1:
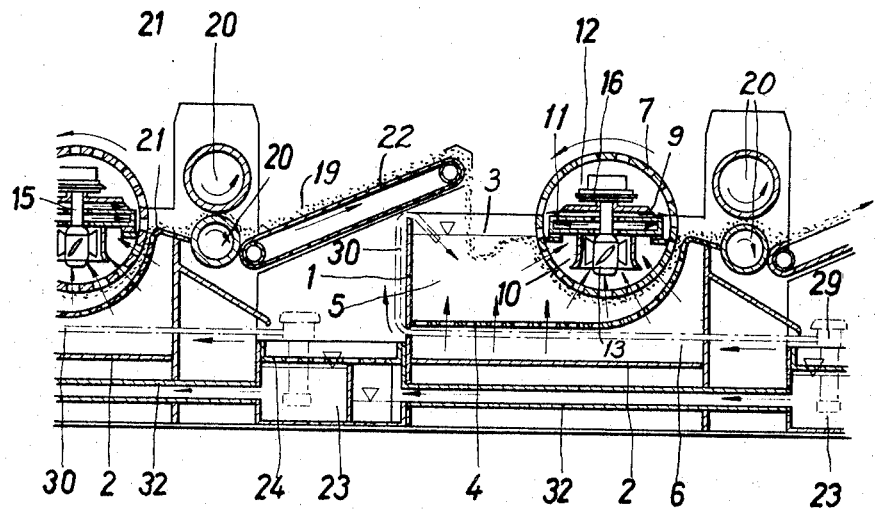
FIGURE 1 is a longitudinal section of the apparatus of the present invention.
Figure 2:
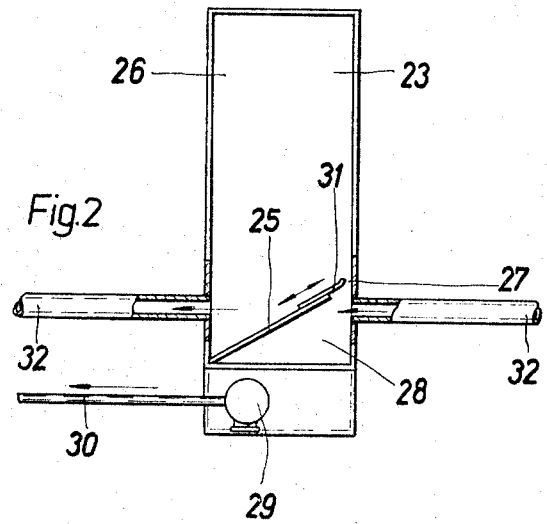
FIGURE 2 is a plan view of the collecting tank of the present invention with the filter or collecting trough removed.
Figure 6:
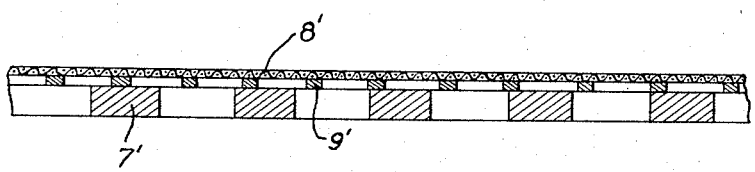
FIGURE 6 is a greatly enlarged illustration of FIGURE 5 with an intermediate layer of a coarse wire sieve interposed between the fine wire mesh cover and the sieve drum jacket.

Referring now to the drawings wherein like reference numerals are used throughout the various views to designate like parts, the apparatus of the present invention comprises various treatment units, each unit being provided with a trough-like container 1 with an oblique bottom 2 for a treatment liquid 3. In the container a sieve bottom 4 is provided which subdivides the container into a treatment zone 5 and a settling zone 6. In the treatment zone 5 a sieve drum 7 is arranged which is partially immersed in the treatment liquid 3. The sieve drum 7 comprises a sieve drum jacket 7 of perforated sheets to which is mounted at its two faces a bearing ring 8 with an U-shaped cross-section. The free area of the sieve drum and the perforations of the sieve drum can be enlarged without detrimental effects if the sieve drum is surrounded by a fine wire mesh 8'. Surprisingly, it has also been found that with the same pump capacity, substantially larger liquor quantities can be drawn through the material if, according to another feature of the present invention, a wide-meshed wire mesh 9' or another such supporting device is disposed between the sieve drum jacket 7 and the fine wire mesh cover 8'. The sieve drum 7 is subdivided by means of partitions 9 into a lower suction space 10, an upper pressure space 11, and a neutral space 12 situated outside the treatment liquid. Vane-type pumps 13 pump the treatment liquid drawn out of the suction space 10 into the pressure space 11 from which the liquid is passed at the face of the drum into a channel 14 extending over the whole length of the bath. This channel 14 is perforated, at least at its lower side, so that the liquid from the sieve drum 7 is returned into the treatment bath equally distributed over the whole length of the bath.

The bearing of a pump shaft 15 is situated outside the liquid in the neutral space 12. Each pump is connected to a joint pump drive 18 outside the drum with a V-belt pulley 16 and a V-belt 17. In the embodiment of the invention shown, not all of the liquid drawn in is led into the lateral canal 14, but part of the treatment liquid is discharged above the pressure space and constantly cleans the sieve drum and removes dirt and fiber particles which possibly adhere to the sieve drum. At the same time the seals of the partitions are covered with liquid, even if the liquid level in the baths varies within certain limits, so that no air can be sucked in which would result in a foaming of the treatment liquid. Thus, even with a high pump capacity and a powerful suction draft, the sucking in of air is substantially eliminated in this manner. Thus, it is possible to draw large quantities of treatment liquor through material 19 to be processed.

Behind each treatment bath a pair of squeeze rollers 20 is set up. For sealing the treatment bath [especially when loose fibrous material is processed] against the squeeze rollers 20 a short chute 21 is used which is arranged at the height of the liquid level. The material 19 is pushed by the sieve drum 7 subjected to a suction draft over the short chute 21 to squeeze rollers 20 where excessive treatment liquid is removed. The material is then transported to the subsequent treatment bath via a conveyor belt 22.

The liquid which is squeezed out of the material being treated is collected in a collecting tank 23. For the separation of fibers and other solid matter the collecting tank is provided at its top with a trough-shaped or box-shaped cover 24 with a sieve or filter bottom. The collecting tank situated beneath the cover 24 is subdivided by a partition 25 into zone 26 and pump zone 28. In zone 26 the liquid coming from the squeeze rollers 20 is collected and from there flows through free area 27 into zone 28 of the collecting tank. In pump zone 28 of the collecting tank a pump 29 is disposed which returns the collected liquid into the appertaining treatment bath at the intake of the bath through a pipe 30.

The collecting tanks of the individual treatment units are connected to each other by means of pipes 32, that is, the collecting zone 26 of one collecting tanks is connected with the pump zone 28 of another collecting tank. As shown, the two zones 26 and 28 of each collecting tank 23 have a different liquid level by which the exchange of the treatment liquid from one collecting tank 23 to another is effected. The difference in the liquid level can be controlled by an adjustable means 31 located at partition 25. By using the adjustable means the size of the free space 27 can be varied. As shown, the exchange of the liquid according to the present invention offers not only the advantage that the individual treatment baths need no longer be set up staggered to each other, but moreover it ensures that in case of a shut-down of the washing apparatus and in case of an eventual further supply of liquid, all treatment liquid containing detergents and other additives are not replaced by fresh water, but rather the fresh water replaces only the treatment liquid contained in the collecting tank, and thus only a small quantity of detergents and other additives are lost, especially since the pump drive is generally coupled to the squeezer drive and thus will stop if the squeezers are stopped. The liquid exchange apparatus of the present invention has proved particularly effective in washing plants when used for washing raw wool.

As shown in FIGURES 3 and 4, a cross bar 34 may be provided above the drum in order to reinforce the drum. The cross bar is connected to the two stationary drum faces, to which faces on the one side the drum drive (not shown) can be mounted and on the other side a pump drive 18 can be mounted. By means of this cross bar the whole drum with the drive can be readily lifted out of the trough-like container 1 and can be replaced by another drum 7 in a minimum amount of time. The drum which has been lifted out of the container can thus be repaired and serviced without the necessity of stopping the operation of the apparatus. The inner, stationary part of the drum may be supported at the tank by means of squares 33.

In FIGURE 4 rollers 35 for supporting the drum are shown by the dashed line. This figure also shows the drum drive which consists of a gear rim 36 at the bearing ring 8 and a pinion 37 which is connected to the drive motor.

If, according to the present invention, each sieve drum with the pump drive the possibly with the drum drive is combined to one constructional unit, it is possible to replace the entire unit in a few minutes by another unit and to repair, clean or otherwise service the unit outside the bath without stopping the apparatus. The unit can be lifted out of the bath at the cross bar by means of a crane and a new unit can be installed in the same manner.

Since modifications of this invention will be apparent to those skilled in the art, it is not desired to limit the invention to the exact constitution shown and described. Accordingly, all suitable modifications and equivalents may be resorted to which fall within the scope of the appended claims.

We claim:

1. An apparatus for the wet-treatment of material which are permeable to liquids which comprises a treatment bath containing a treatment liquid, at least one cylindrical sieve drum with a perforated surface rotatably disposed within said treatment bath and at least partially immersed in the treatment liquid, the cylindrical surface of said sieve drum serving as a conveying means, said sieve drum being subdivided by partition means which are substantially parallel to the sieve drum axis into at least one suction space and an adjacent pressure space, and at least one pump means disposed within said sieve drum for drawing the treatment liquid through the material being treated into said suction space and said pressure space.

2. The apparatus of claim 1, wherein the faces of the sieve drum are connected to the partition means and form a stationary unit and are sealed against the rotating sieve drum jacket.

3. The apparatus of claim 1, wherein the pumps in the sieve drum are arranged substantially perpendicular to the partition means and wherein the pump bearings are located outside the treatment liquid.

4. The apparatus of claim 1, wherein the partition means are adjustably disposed in the sieve drum.

5. The apparatus of claim 1, wherein the pump drive is located outside of the sieve drum.

6. The apparatus of claim 1 wherein the sieve drum bearings are located outside of the treatment liquid.

7. The apparatus of claim 6 wherein at the faces of the sieve drum a bearing ring with an U-shaped cross-section is fastened to the sieve drum jacket said bearing ring receiving at least one roller for supporting the sieve drum and providing means on which the drum rests and rolls on.

8. The apparatus of claim 7, wherein the rollers are mounted on the stationary faces of the sieve drums.

9. The apparatus of claim 7, wherein the rollers have a diameter which substantially corresponds to the free distance of the rolling surfaces.

10. The apparatus of claim 7, wherein at the drive face of the sieve drum, at the bearing ring, a gear rim is provided into which the pinion of the drum drive outside the treatment liquid engages.

11. The apparatus of claim 1, wherein a conveying means is provided for transferring the material being treated to the conveying surface and squeeze rollers are provided behind the treatment bath for removing excess treatment liquid from the material being treated.

12. The apparatus of claim 11, wherein a short chute arranged at the height of the liquid level is disposed between the conveying means and the squeeze rollers for sealing the treatment bath against the squeeze rollers.

13. The apparatus of claim 11, wherein more than one treatment bath is used, and each treatment bath is provided with a collecting tank for collecting the treatment liquid removed from the material being treated by the squeeze rollers, said collecting tank provided with a pump means for returning the treatment liquid to the appertaining treatment bath, said collecting tank also connected to each other by pipe means which provide for an exchange of the treatment liquid.

14. The apparatus of claim 13, wherein a trough-shaped cover with a sieve bottom is provided at the top of the collecting tank.

15. The apparatus of claim 13, wherein each collecting tank is subdivided by a partition means into two zones, the liquid level in the two zones of the collecting tank differing.

16. The apparatus of claim 15, wherein the two zones of the collecting tank communicate with each other through an adjustable free area for exchanging the liquid.

17. The apparatus of claim 1, wherein the sieve drums are surrounded by a fine wire mesh cover.

18. The apparatus of claim 17, wherein a supporting means is disposed between the sieve drum jacket and the fine wire mesh cover.

19. The apparatus of claim 18, wherein the supporting means is a wide-meshed wire mesh.

20. The apparatus of claim 1, wherein a cross bar is connected to the sieve drum faces outside of the sieve drum.

21. The apparatus of claim 11, wherein the sieve drum, the pump drive and the drum drive form an exchangeable constructional unit.

22. A method for the wet-treatment of materials which are permeable to liquids which comprises continuously conveying the material to be treated on the surface of an element subjected to a suction draft, transferring said material on said surface through a treatment bath containing a treatment liquid, drawing the treatment liquid through the material being treated into a suction space and then into an axially disposed pressure space, discharging at least part of the treatment liquid from the pressure space at one face of the sieve drum, returning said discharged treatment liquid to the treatment bath and removing the treated material from the conveying surface.

23. The method of claim 22, wherein the material being treated are textile materials.

24. The method of claim 22, wherein at least part of the treatment liquid is discharged from the pressure space through the sieve drum jacket.

25. The method of claim 22, wherein the material removed from the conveying surface is squeezed to remove the excess treatment liquid.

26. The method of claim 22, wherein several treatment baths are connected in series and wherein the liquid exchanged between the baths is counter-current whereas the liquid exchange in each individual bath is co-current.

27. The method of claim 26, wherein the liquid exchanged between the individual treatment baths is effected by adjusting the level difference in the collecting tanks associated with each treatment bath.

28. The method of claim 22, wherein above the pressure space the interior of the sieve drum is sprayed with the treatment liquid so that the seals of the partition means and/or the seals of the suction space are covered with the treatment liquid.

References Cited

UNITED STATES PATENTS

| | | | |
|---|---|---|---|
| 3,011,328 | 12/1961 | Fleissner | 68—158 |
| 3,126,556 | 3/1964 | Fleissner | 8—151.2 |
| 3,199,126 | 8/1965 | Chaikin et al. | 68—22 |

FOREIGN PATENTS 6,601 1891 Great Britain.

WILLIAM I. PRICE, *Primary Examiner.*

U.S. Cl. X.R.

8—156; 68—22, 158